US008108388B2

(12) United States Patent
Gideoni et al.

(10) Patent No.: US 8,108,388 B2
(45) Date of Patent: Jan. 31, 2012

(54) SIGNIFICANT CHANGE SEARCH ALERTS

(75) Inventors: Michal Gideoni, Seattle, WA (US);
Dmitriy Meyerzon, Bellevue, WA (US);
Menton J. Frable, Redmond, WA (US);
Mircea Neagovici-Negoescu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 465 days.

(21) Appl. No.: 11/412,725

(22) Filed: Apr. 26, 2006

(65) Prior Publication Data
US 2007/0255744 A1    Nov. 1, 2007

(51) Int. Cl.
*G06F 17/30* (2006.01)
(52) U.S. Cl. .................... 707/731; 707/722; 707/732
(58) Field of Classification Search .................. None
See application file for complete search history.

(56) References Cited

U.S. PATENT DOCUMENTS

| | | | | |
|---|---|---|---|---|
| 5,717,924 | A * | 2/1998 | Kawai | 707/102 |
| 5,721,903 | A | 2/1998 | Anand et al. | 395/605 |
| 5,898,836 | A * | 4/1999 | Freivald et al. | 709/218 |
| 6,067,541 | A * | 5/2000 | Raju et al. | 707/3 |
| 6,226,630 | B1 | 5/2001 | Billmers | 707/3 |
| 6,256,773 | B1 * | 7/2001 | Bowman-Amuah | 717/121 |
| 6,516,337 | B1 * | 2/2003 | Tripp et al. | 709/202 |
| 6,633,910 | B1 * | 10/2003 | Rajan et al. | 709/224 |
| 6,721,748 | B1 | 4/2004 | Knight et al. | 707/10 |
| 7,774,242 | B2 * | 8/2010 | Kubach et al. | 705/28 |
| 7,925,649 | B2 * | 4/2011 | Jeh et al. | 707/722 |
| 7,933,900 | B2 * | 4/2011 | Reddy et al. | 707/732 |
| 2002/0198946 | A1 | 12/2002 | Wang et al. | 709/206 |
| 2004/0030741 | A1 | 2/2004 | Wolton et al. | 709/202 |
| 2004/0243555 | A1 * | 12/2004 | Bolsius et al. | 707/3 |
| 2004/0249848 | A1 | 12/2004 | Carlbom et al. | 707/102 |
| 2005/0027742 | A1 * | 2/2005 | Eichstaedt et al. | 707/104.1 |
| 2005/0033777 | A1 | 2/2005 | Moraes et al. | 707/202 |
| 2005/0060056 | A1 | 3/2005 | Ta | 700/108 |
| 2005/0143099 | A1 | 6/2005 | Piccioni | 455/456.5 |
| 2005/0283567 | A1 * | 12/2005 | Popescu-Stanesti et al. | 711/106 |
| 2005/0285740 | A1 * | 12/2005 | Kubach et al. | 340/572.1 |
| 2006/0064476 | A1 * | 3/2006 | Decasper et al. | 709/223 |
| 2006/0074911 | A1 | 4/2006 | Neagovici-Negoescu et al. | 707/8 |

FOREIGN PATENT DOCUMENTS

| | | |
|---|---|---|
| WO | WO03/069510 | 8/2003 |
| WO | WO 2004/114120 A1 | 12/2004 |
| WO | WO 2005/119487 A1 | 12/2005 |

OTHER PUBLICATIONS

Leonardi et al.; Detecting Changes on Unordered XML Documents Using Relational Databases: A Schema-Concious Approach; Nov. 2, 2005; pp. 509-516.*
Cuppens; "Managing Alerts in a Multi-Intrusion Detection Environment"; 17th Annual Computer Security Applications Conference 2001; pp. 1-2.

(Continued)

*Primary Examiner* — Farhan Syed
(74) *Attorney, Agent, or Firm* — Merchant & Gould

(57) ABSTRACT

An alert search mechanism is used with search engines such as a crawler to search for desired documents and/or resources. Particular documents are found by using search queries. The search mechanism track values of a set of relevant properties in queries. Whenever a document is searched for by the system, the values of these set of properties are matched with the old value. If there is no match, this is an indication that the document has changed.

19 Claims, 5 Drawing Sheets

OTHER PUBLICATIONS

Leonardi et al.; "Detecting Changes on Unordered XML Documents Using Relational Databases: A Schema-Conscious Approach"; pp. 509-516.

Beitzel et al.; "Evaluation of Filtering Current News Search Results"; pp. 494-495.

European Search Report dated Oct. 5, 2009, issued in EP Appl. No. 07753826.2; 7 Pgs.

Adam, et al.; "*Detecting data and schema changes in scientific documents*"; Advances in Digital Libraries, 2000; Proceedings IEEE Washington, .D.C.; May 22-24, 2000; 12 Pgs.

Office Action dated Mar. 16, 2011, issued in Russian Application No. 2008142357, w/Translation.

\* cited by examiner

SIGNIFICANT CHANGE SEARCH ALERTS

BACKGROUND

Search alerts are persistent queries held in a system. Whenever the system identifies a new query result (such as a document, list-item, folder, and the like) that satisfies the persistent query, the alert user is notified about this result. The alert user can typically choose the frequency for alert to be sent to the user. For example, the frequency for sending the alert can be daily.

However, the search alert results for search alert users can be annoying to users by (all too often) sending irrelevant results. Specifically, irrelevant results are generated by changes in the search for documents that are not interesting for the users.

For example, a user desires to search for the term "patent" and creates a daily alert for this search in a system (such as computers networked over the Internet). The user will typically get a daily notification with all the results that were discovered in the last day. The system returns results listing every document that contains the term "patent" that was either discovered by the system or modified during the last day. In many cases, certain changes are not interesting enough for the user to be notified about and can be considered as being annoying. The user may consider the results to be annoying when a document can have a change of a security descriptor or a change to other properties which are not visible to the user.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

The present disclosure is directed to alert search mechanisms that track values of only a set of relevant properties in queries. Whenever a document is crawled by the system the values of this set of properties (referred to as "content signature") are matched with the old values (referred to as "old content signature"). If there is no match, this is an indication that the document has changed. If only a non-interesting property had changed (such as a security descriptor), the document will not appear to have changed since the value of this property was neither tracked by the old content signature nor by the new content signature and thus there is still a match.

Additionally, the set of relevant properties for a document (e.g., schema) can be changed by an administrator. If the set of properties is changed, for example, by a property being added to the "relevant set," the documents will appear to have changed. The documents appear to have changed because the old content signature includes a different set of properties than the new content signature such that different content can be matched. Thus the system can determine that a schema for a document, rather than the document itself, has changed. In an embodiment, the system can detect this situation by tracking a "schema version" digital signature such as a checksum. If the new content signature does not match the old content signature and the "Schema version" has not changed, then the document has been changed. If the "schema version" has also changed, then the document can be considered to have not been changed (because it may be better to avoid sending an alert that might annoy the user by sending a notification for a document that has not actually been changed).

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments are described more fully hereinafter with reference to the accompanying drawings, which form a part hereof, and which show, by way of illustration, specific embodiments. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The following detailed description is, therefore, not to be taken in a limiting sense.

Figure 1:
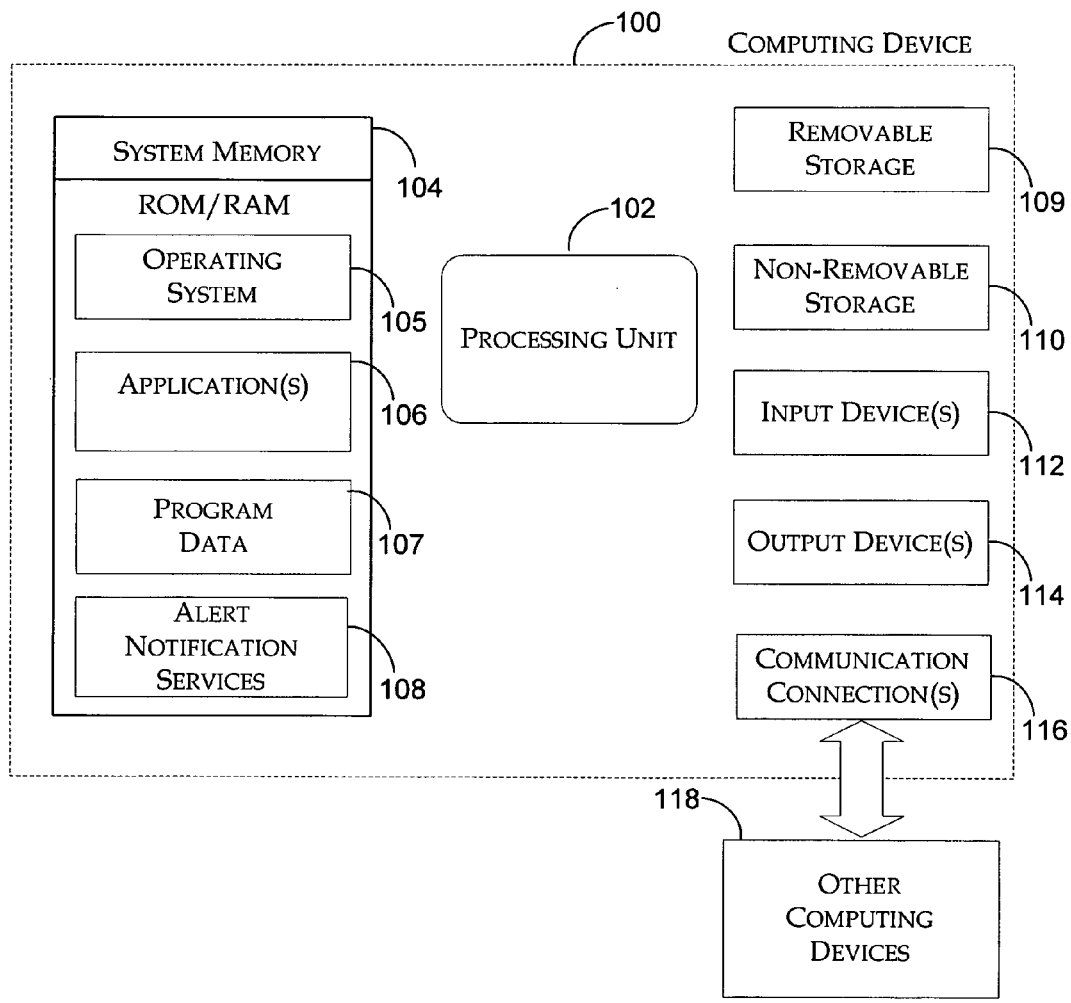
FIG. 1 illustrates a computing device that may be used according to an example embodiment of the present invention.
Figure 2:
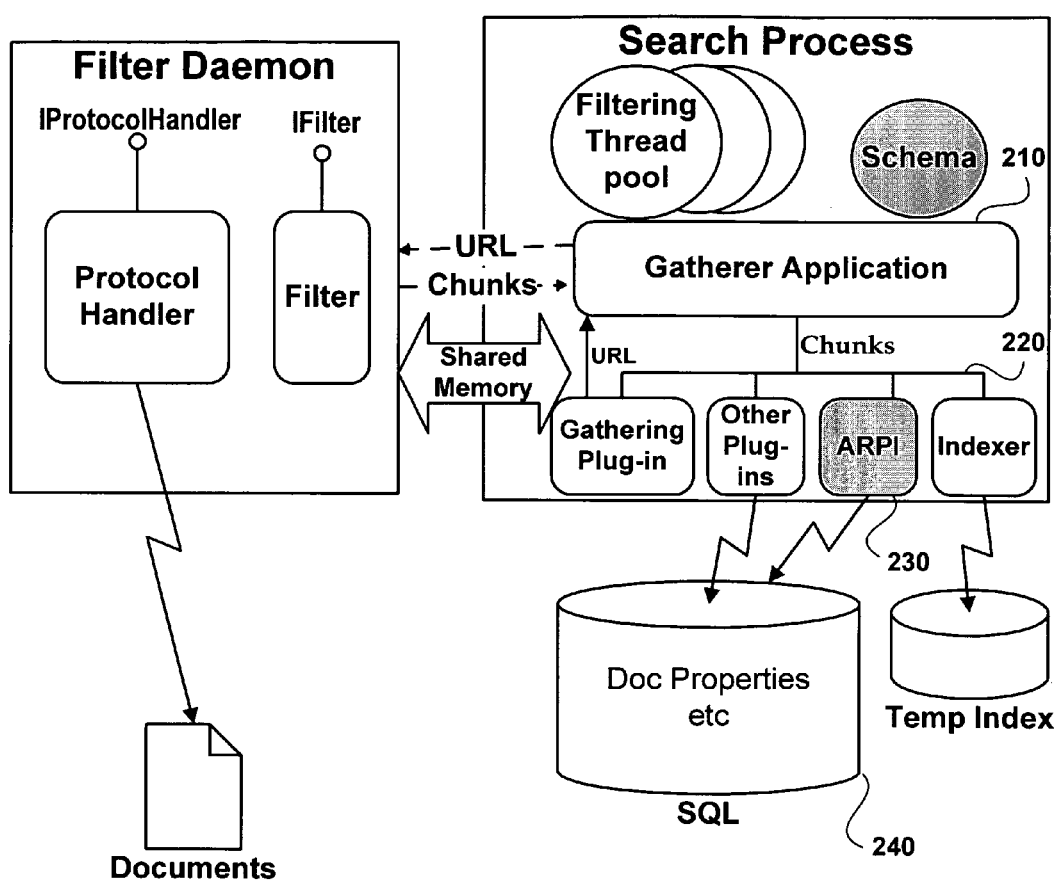
FIG. 2 illustrates a block diagram of a system for significant change search alerts.
Figure 3:
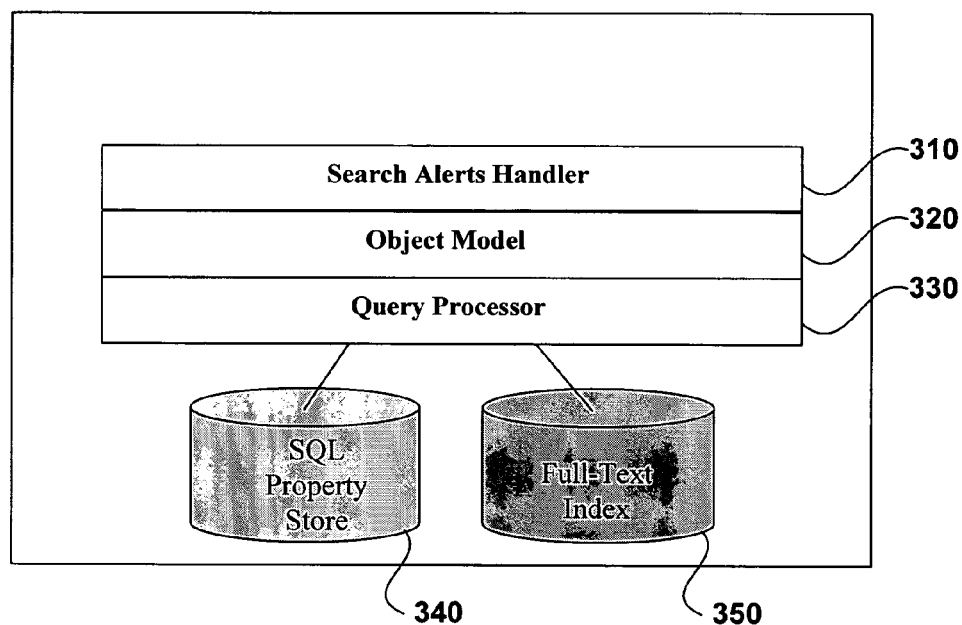
FIG. 3 illustrates a block diagram of a system search alert query handling mechanism.
Figure 4:
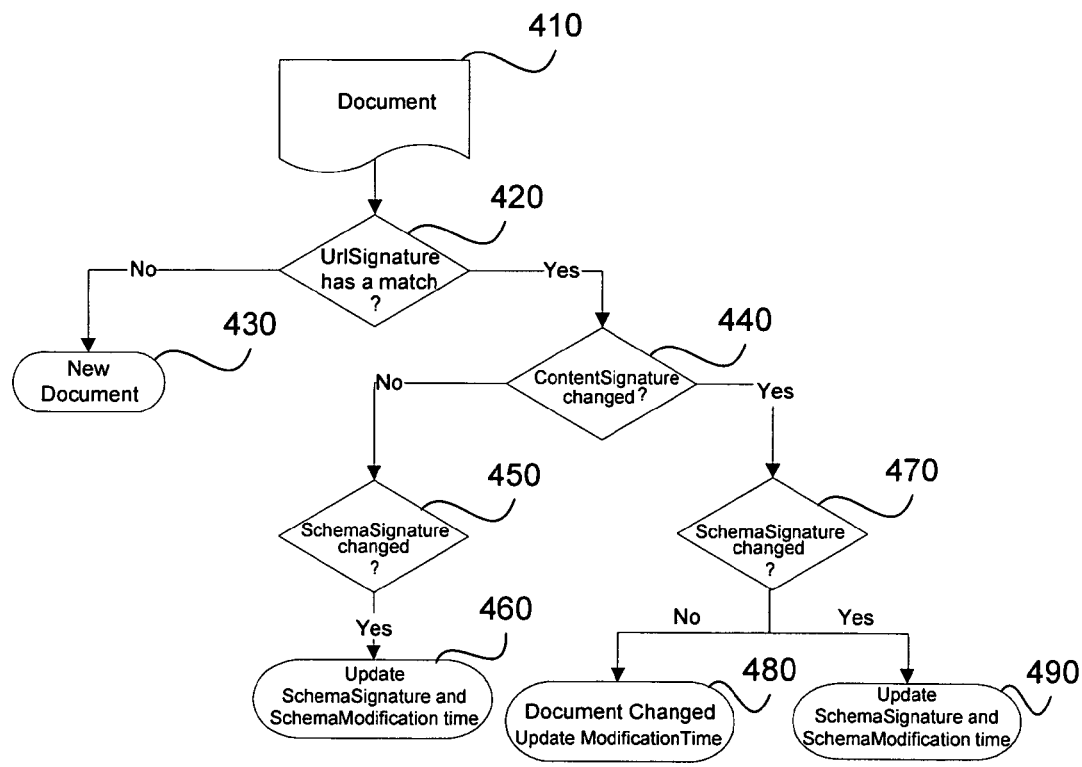
FIG. 4 is a flow diagram of a process for determining whether to trigger an alert notification.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. Alert notification services 108, which are described in detail below with reference to FIGS. 2-4, are implemented within system memory 104.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The present disclosure is directed to alert search mechanisms that track values of a set of relevant properties in queries. A web crawler, which is an automated program that browses the World Wide Web in a methodical manner, can be used to search for documents. Whenever a document, for example, is "crawled" by the system, the values of these set of properties (referred to as "content signature") are matched with the old values (referred to as "old content signature"). (The documents can also be matched by comparing the values of the document properties themselves; however, this is not usually as efficient as, for example, using an MD5 hash function to produce signatures that can then be compared). When there is no match, this is an indication that the document has interesting content that has changed. If only a non-interesting property has changed (such as a security descriptor), the document will not usually be flagged as being changed because the value of this property was neither tracked by the old content signature nor by the new content signature.

The set of relevant properties for a document (e.g., schema) can be changed by an administrator. If the set is changed, for example, by a property being added to the "relevant set," the documents will appear to have changed. The documents appear to have changed because the old content signature includes a different set of properties than the new content signature such that different content can be matched. Thus the system can determine that a schema for a document, rather that the document itself, has changed.

For example, if the set of relevant properties is property A and property B, the (old) content signature includes the values of property A and the value of property B. When an administrator adds a property C to the set of relevant properties, the schema changes. A new content signature will typically include the values of all the properties (A, B and C). When the new content signature (which comprises (A+B+C) is compared with the old content signature (A+B), the values do not match. When the values do not match, the document thus appears to have changed, notwithstanding the fact that A and B property values themselves have not changed.

The system can detect this situation by tracking a "schema version" digital signature such as a checksum. For example, a checksum of the property identifiers, which does not include the property values, can be tracked. Tracking the checksum of the property identifiers typically will capture the presence of relevant properties in the document If the new content signature does not match the old content signature and the "schema version" has not changed, then the document has been changed. If the 'schema version' has also changed, then the document can be considered to have not been changed.

FIG. 2 illustrates a block diagram of a system for significant change search alerts in accordance with aspects of the present invention. Gatherer application 210 provides a generic mechanism for collecting searched-for items such as documents from multiple stores, various formats, and languages. Gatherer application 210 digests the document's content into a unified format suitable primarily for building a full text index over the documents. Gatherer pipeline 220 provides multiple consumers with access to gathered documents. Gatherer application 210 typically allows fetching the documents once and processing the same data by multiple consumers.

The ARPI (archival plugin) 230 is a consumer of the gatherer pipeline. When a document is crawled by the gatherer application 210, a digital signature (such as an MD5 hash function) is calculated for the contents of the crawled document. The ARPI writes the MD5 hash in addition to the rest of the properties to the Property Store (such as that stored on SQL Database 240). In addition, the ARPI also can write the schema signature, which can be (for example) a checksum of all relevant properties in the document.

FIG. 3 illustrates a block diagram of a system search alert query handling mechanism in accordance with aspects of the present invention. When a user creates a search alert, the resulting alert query is stored in search alerts handler 310. The alert is then triggered, for example at a quantum (which can be, for example, a predetermined period of time) such as daily or weekly. When the alert is triggered, search alerts handler 310 executes a search query for checking whether there are any new results about which the user of an alert should be notified. Object model 320 receives the query and transfers the query to query processor 330. Query processor 330 issues query commands to the properties store 340 and full-text index 350. As described below, the query is used to determine whether there are any new documents, for example, that satisfy the search query and that have been added after the last notification time or if there are any relevant documents that have changed since the last notification time.

An example query that fetches the top 10 results that have been created/changed after the last notification time and ordered by rank follows:

```
SELECT top 10 WorkId, docTitle, docAuthor, path ...
FROM SCOPE( )
WHERE FREETEXT(defaultProperties, 'query terms')
AND
        ((DiscoveryTime > 'last time this search query was executed')
            //This document was -- just discovered
OR
        (ModificationTime > 'last time this search query was executed'
    ))
        //This document was recently modified
THEN ORDER_BY_RANK( )
```

As discussed above, users often are presented with search results that contain documents that have changes that are not relevant for the alert user. One primary reason is that a digital signature (such as an MD5 hash) is calculated on any trackable property of a schema set. If an administrator has added or removed properties from the set then, without more, an alert could be falsely triggered.

When the full-text index is created, new properties for documents are calculated and added to the property store (by the ARPI). The new properties are used for setting properties such as "Discovery Time" and "Modification Time" of a searched-for document. Discovery Time is the first time a document is discovered by a gatherer application performing a crawl. Modification time indicates when there was any valuable modification made to the document since a previous crawl.

In order to determine the "ModificationTime" property, a "UrlSignature" property, a ContentSignature property, SchemaSignature property, and a SchemaModificationTime property are tracked. An SQL table MSSAlertDocHistory can be used to track the properties for all the documents and resources that have been processed by the system.

For example, the UrlSignature property is an MD5 hash of the URL, the ContentSignature is an MD5 hash on the properties that are tracked by alerts, the SchemaSignature property is a checksum (or other suitable digital signature, including an MD5 hash) of the set of properties tracked by alerts, and the SchemaModificationTime property is the last time that the set of properties that are tracked by alerts was changed. A "ModificationTime" property can be can also be used to specify when the document was last modified.

When changes to the set of properties are made, the changes are detected by the gathering application of the alert notification system. The alert notification system typically does not choose to notify a user that a document changed when what actually changed was the set of "relevant properties" because the user is typically not interested when a new property is merely added to the set of relevant properties or when a property is merely removed from the set of relevant properties.

FIG. 4 is a flow diagram of a process for determining whether to trigger an alert notification in accordance with aspects of the invention. To determine whether a document 410 has been discovered or modified, a process (such as a gatherer application 210) determines at operation 420 whether the digital signature of a URL that is associated with document 410 has been changed. If the process determines that there is no match for the digital signature, the process proceeds to operation 430 where the alert system reports that a new document of interest has been recently created. If the process determines that there is a match for the URL signature, the process proceeds to operation 440.

A problem may exist if two documents point to the same UrlSignature property. When two documents point to the same UrlSignature property and a full crawl is being performed, the system may report that there are relevant changes when in fact there may be none. Performing and saving a MD5 hash of 64 bits would makes this problem extremely unlikely, even when the corpus (e.g., body of text of the document) is very large. To make the problem even more unlikely to occur, the whole URL can be saved in addition to saving the UrlSignature.

At operation 440, the process determines whether the digital signature of content that is associated with document 410 has been changed. If the process determines that there is no match for the content signature, the process proceeds to operation 450. If the process determines that there is a match for the content signature, the process proceeds to operation 470.

At operation 450, the process determines whether the schema that is associated with document 410 has been changed. If the process determines that the schema has been changed, the properties of the schema signature and the schema modification time are updated (460). (If the process determines that the schema has not been changed, properties associated with document 410 typically need not be updated.

At operation 470, the process determines whether the schema signature has been changed. If the process determines that the schema has been changed, the process proceeds to operation 490 where the properties of the schema signature and the schema modification time are updated (the document modification time property is not typically updated). If the process determines that the schema has not been changed, the process proceeds to operation 480. At operation 480, a notification is sent by the alert system that a document that interest has been recently modified. The modification time property is also updated.

TABLE 1 illustrates a common scenario encountered when changes are made to an existing document:

TABLE 1

|  | T0 Alert Notification | T1 Document change #1 | T2 Crawl | T3 Document change #2 | T4 Crawl | T5 Alert notification |
|---|---|---|---|---|---|---|
| Content signature | X | No effect until a crawl occurs. | X1 | No effect until a crawl occurs. | X2 | Notify about change #1 and change #2. |
| Schema signature | Y |  | Y |  | Y |  |
| Discovery time | T |  | T |  | T |  |
| Schema Modification time | T |  | T |  | T |  |
| Modification time | T |  | T2 |  | T4 |  |

At time T0, an alert notification has been made with the status of the existing document properties content signature, schema signature, discovery time, schema modification time, and modification time being recorded as X, Y, T, T, and T, respectively.

At time T1, a first change is made to the document. The change to the document has no effect on the document properties because no crawl has occurred, and the changes have not been noticed by the system.

At time T2, a crawl occurs. A change in the content signature is detected and the status of content signature is updated to X1. The status of the modification time is updated to T2. (No alert notification is performed at this time because crawls typically occur on an ongoing basis, whereas alert notifications can be performed at predetermined intervals, such as the alert notifications that happen at times T0 and T5, as shown in the table).

At time T3, a second change is made to the document. The change to the document has no effect on the document properties until a crawl occurs.

At time T4, a second crawl occurs. A change in the content signature is detected and the status of content signature is updated to X2 and the modification time is updated to T4.

At time T5, an alert notification occurs. The user of the alert notification system is notified of first and second changes to the existing document.

TABLE 2 illustrates a when changes are made to an existing document and to a schema that is associated with the existing document:

TABLE 2

| | T0 Alert Notification | T1 Crawl | T2 Change to schema | T3 Document change | T4 Crawl | T5 Alert notification |
|---|---|---|---|---|---|---|
| Content signature | X | X | No effect until a crawl occurs | No effect until a crawl occurs. | X2 | Do not notify user because the change is considered to be a schema change. |
| Schema signature | Y | Y | | | Y1 | |
| Discovery time | T | T | | | T | |
| Schema Modification time | T | T | | | T4 | |
| Modification time | T | T | | | T1 | |

At time T0, an alert notification has been made with the status of the existing document properties content signature, schema signature, discovery time, schema modification time, and modification time being recorded as X, Y, T, T, and T, respectively.

At time T1, a crawl is made wherein no changes have been detected to the document or schema.

At time T2, a schema change occurs. (No alert notification is performed at this time because crawls typically occur on an ongoing basis, whereas alert notifications can be performed at predetermined intervals, such as the alert notifications that happen at times T0 and T5, as shown in the table).

At time T3, a change is made to the document. The change to the document has no effect on the document properties until a crawl occurs.

At time T4, a second crawl occurs. A change in the content signature is detected and the status of content signature is updated to X2, the status of the schema signature is updated to Y1, and the schema modification time is updated to T4. The status of the modification time is not updated even though the status of the content signature has changed from X1 to X2 because the status of the schema modification time has also changed. It is not necessarily clear whether the change to content signature should be attributed to an actual change in one of the interesting properties of the document, or whether the change should be attributed to a change in the set of properties that are being tracked.

At time T5, an alert notification time occurs. The user of the alert notification system is not notified of change to the existing document because the schema has been changed.

In an alternate embodiment, the list of properties in the set of "relevant properties" can be tracked with versioning information. Whenever the change to the set of properties is made, the version level can be incremental. The version level can also be stored in the SQL table MSSAlertDocHistory (as discussed above with respect to FIG. 3). When a crawl occurs, and the current version is different than the stored version, the version value in the table and the value of the schema signature property are updated, whereas the schema modification time is not updated and remains the same. Accordingly, any change that occurs to the existing document after the last alert notification (but was made before the change to the set of relevant properties), is normally sent to the user. Also, any change that occurs to the existing document after changes are made to the set of relevant properties is not sent to a user.

In the alternate embodiment, it is possible that some changes that actually occurred will not be reported to the user. This embodiment can be used in accordance with a policy of using some valid notifications in favor of an excess of irrelevant notifications.

In another embodiment, a basic properties signature can be used to track changes that are made to a predetermined set of properties. When the version of the trackable properties does not match the version held in the SQL table MSSAlertDocHistory, the basic properties signature can be consulted. If the basic properties signature does not match, the user can be notified of the change. Accordingly, the user will miss a smaller number of notifications as compared to notifications made solely based upon changes to the trackable properties.

In yet another embodiment, URL signatures can be tracked to help determine when a crawler has in fact re-discovered the same documents multiple times. For example, when an administrator modifies the rules used during a crawl rules, or modifies the account credentials, many documents can become inaccessible to the crawler. Fixing the problem often causes many documents to be first deleted from the index, and then re-added. To handle this problem, URL signatures are maintained (and not deleted), regardless of the crawler behavior with respect to removing content from the catalog. Accordingly, the maintained URL signatures can be consulted to avoid spurious notifications that result from re-adding content.

Figure 5:
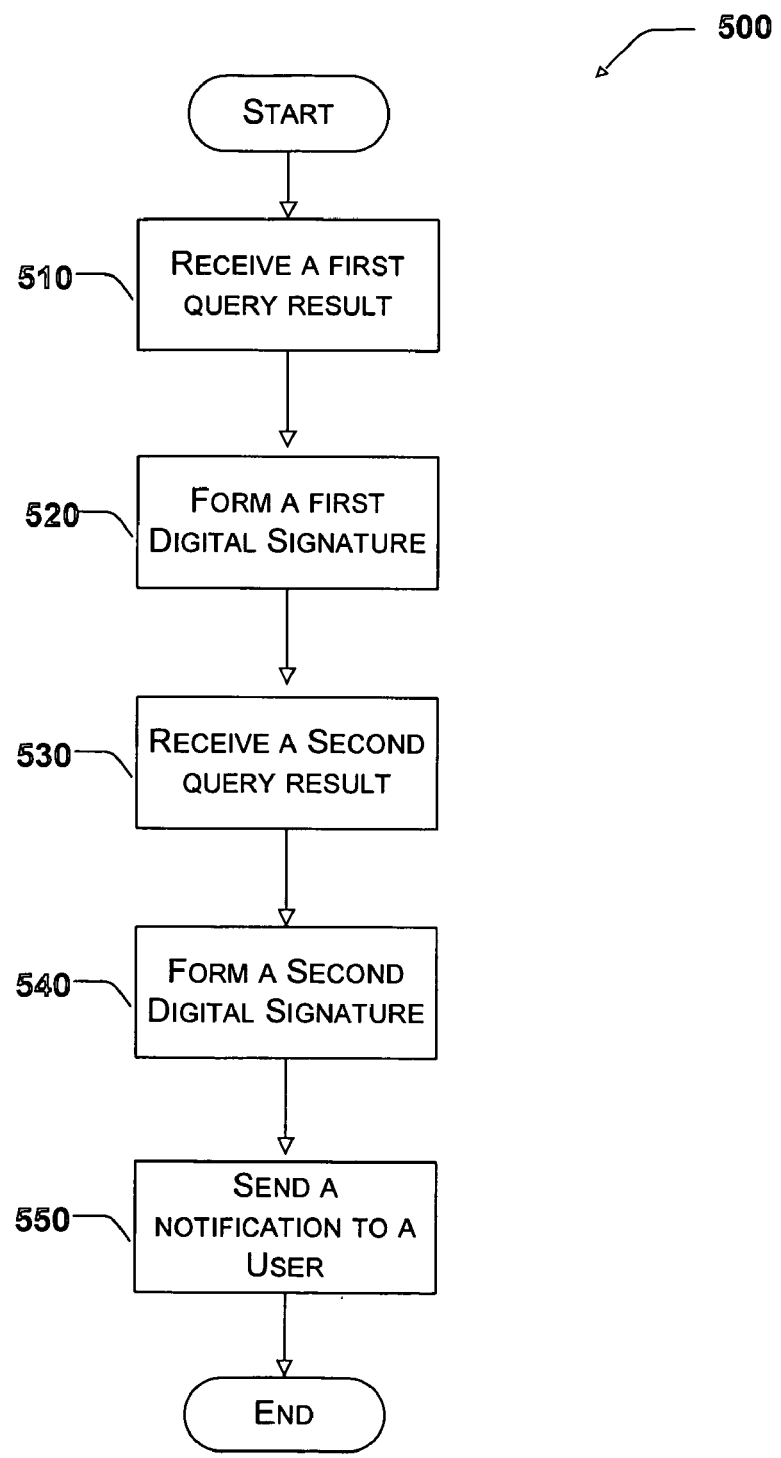
FIG. 5 is a flow diagram illustrating a process for sending search alert results.

FIG. 5 is a flow diagram illustrating a process for sending search alert results. In operation 510 of process 500, a first query result is received from a first search engine, wherein the query result is obtained in response to a first query that comprises a first search value for locating resources. In operation 520, a first digital signature is formed of a first relevant portion of the resource identified by the first search query results, wherein the first relevant portion comprises content identified by the first search value. In operation 530, a second query result is received from a second search engine, wherein the query result is obtained in response to a second query that comprises the first search query, and wherein the second search engine is the same as or different from the first search engine. In operation 540, a second digital signature is formed of a second relevant portion of the resource identified by the second search query results, wherein the second relevant portion comprises content identified by the first search value. In operation 550 a notification is sent to a user in response to a comparison of the first and second digital signatures being different.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for sending search alert results, comprising:
   establishing a schema consisting of a set of properties to be tracked within searched resources; wherein the set of properties is a subset of the properties that are used in determining when a resource changes; wherein the schema changes when a change is made to the set of properties to be tracked, wherein the properties set a discovery time and a modification time of a search for document, wherein the discovery time is a first time a document is discovered by a gatherer application performing a crawl and wherein the modification time is determined using at least a content signature property, a URL signature property, and a schema signature property;

receiving a first query result from a first search engine, wherein the query result is obtained in response to a first query that comprises a first search value for locating resources;

forming a first digital signature of a first relevant portion of the resource identified by the first search query results and the set of properties to be tracked, wherein the first relevant portion comprises content identified by the first search value;

receiving a second query result from a second search engine, wherein the query result is obtained in response to a second query that comprises the first search query, and wherein the second search engine is the same as or different from the first search engine;

forming a second digital signature of a second relevant portion of the resource identified by the second search query results and the set of properties to be tracked, wherein the second relevant portion comprises content identified by the first search value;

sending a notification to a user in response to a comparison of the first and second digital signatures being different and a determination that the schema has not changed between the forming of the first digital signature and the second digital signature; and forming a third digital signature of a third relevant portion of the resource identified by the first search query results, wherein the third relevant portion comprises content identified by a second search value;

forming a fourth digital signature of a fourth relevant portion of the resource identified by the second search query results, wherein the fourth relevant portion comprises content identified by the second search value comparing the first and second digital signatures; and sending a notification to a user in response a comparison of the third and fourth digital signatures being different.

2. The method of claim 1 wherein the first search value comprises a set of relevant properties.

3. The method of claim 2 further comprising forming a digital signature of a URL of the resource identified by the first search query results.

4. The method of claim 1 wherein the first and second search engines are crawlers.

5. The method of claim 1 wherein the notification is sent to the user at predetermined intervals of time.

6. The method of claim 1 further comprising forming a digital signature of a URL of the resource identified by the first search query results.

7. The method of claim 1 further comprising:
forming a fifth digital signature of a schema of the resource identified by the first search query results; and
forming a sixth digital signature of a schema of the resource identified by the second search query results.

8. The method of claim 7 wherein the notification is not sent to a user in response to a comparison of the fifth and sixth digital signatures being different.

9. The method of claim 1 further comprising forming a full-text index of the resource identified by the first search query results.

10. A system for sending search alert results, comprising:
a processor and a computer-readable storage memory;
an operating environment stored on the computer-readable memory and executing on the processor;
a search alerts handler for storing and issuing alert queries that comprise search values for searching for documents;
a property store for storing property sets of properties of a search value from documents identified by an alert query; wherein the set of properties is a subset of the properties that determine when a document changes; wherein the set of properties defines a schema; wherein the schema changes when a change is made to the set of properties; wherein the properties set a discovery time and a modification time of a searched for document, wherein the discovery time is a first time a document is discovered by a gatherer application performing a crawl and wherein the modification time is determined using at least a content signature property, a URL signature property and a schema signature property; and
a gatherer for detecting when changes to the set of properties are made, wherein the gatherer detects the changes by comparing a first property set of properties of a search value in a document identified by a search value at a first time with a second property set of properties of the search value in the document identified by the search value at a second time, and wherein the gatherer notifies a user of the document associated with the detected changes when the schema has not changed between the first time and the second time.

11. The system of claim 10 wherein the documents comprise media content.

12. The system of claim 10 wherein the gatherer is further arranged to construct a full text index of the document identified by the search value at the first time.

13. The system of claim 10 wherein the URL signature uses an MD5 hash of a URL for the document.

14. The system of claim 13 wherein the schema signature property is updated when a crawl is performed.

15. The system of claim 13 wherein the property set comprises a property for a schema modification time of a schema for the document identified by the search value at the first time, and wherein the gatherer is further arranged to notify users of document changes that have a modification time that is after the schema modification time.

16. A computer-readable storage memory comprising computer-executable instructions for:
storing a property set of properties of a search value for a document identified by an alert query at a first and a second time, wherein the stored property sets are digital signatures of portions of the identified document that comprise the search value; wherein the property set is a subset of properties that determines when a document identified by the alert changes; wherein the properties set a discovery time and a modification time of a searched for document wherein the discovery time is a first time a document is discovered by a gatherer application performing a crawl and wherein the modification time is determined using at least a content signature property, a URL signature property and a schema signature property;
comparing the property set from the first time with the property set from the second time; and
sending a notification to a user in response to the property set from the first time being different from the property set from the second time when a schema version that is associated with the document has not changed; wherein the schema version identifies a set of properties that are monitored to determine whether a resource is tracked; and wherein the schema version changes when a first property is added to the set of the properties and when a second property is removed from the set of the properties.

17. The computer-readable storage medium of claim 16 further comprising computer-executable instructions wherein the URL signature property comprises a digital signature of a URL that is associated with the document that is identified by the alert query at the first time.

18. The computer-readable storage medium of claim 16 wherein the schema signature property comprises a digital signature of a schema that is associated with the document that is identified by the alert query at the first time.

19. The tangible medium of claim 16 further comprising computer-executable instructions for tracking versions of lists of the stored property sets.

* * * * *